UNITED STATES PATENT OFFICE.

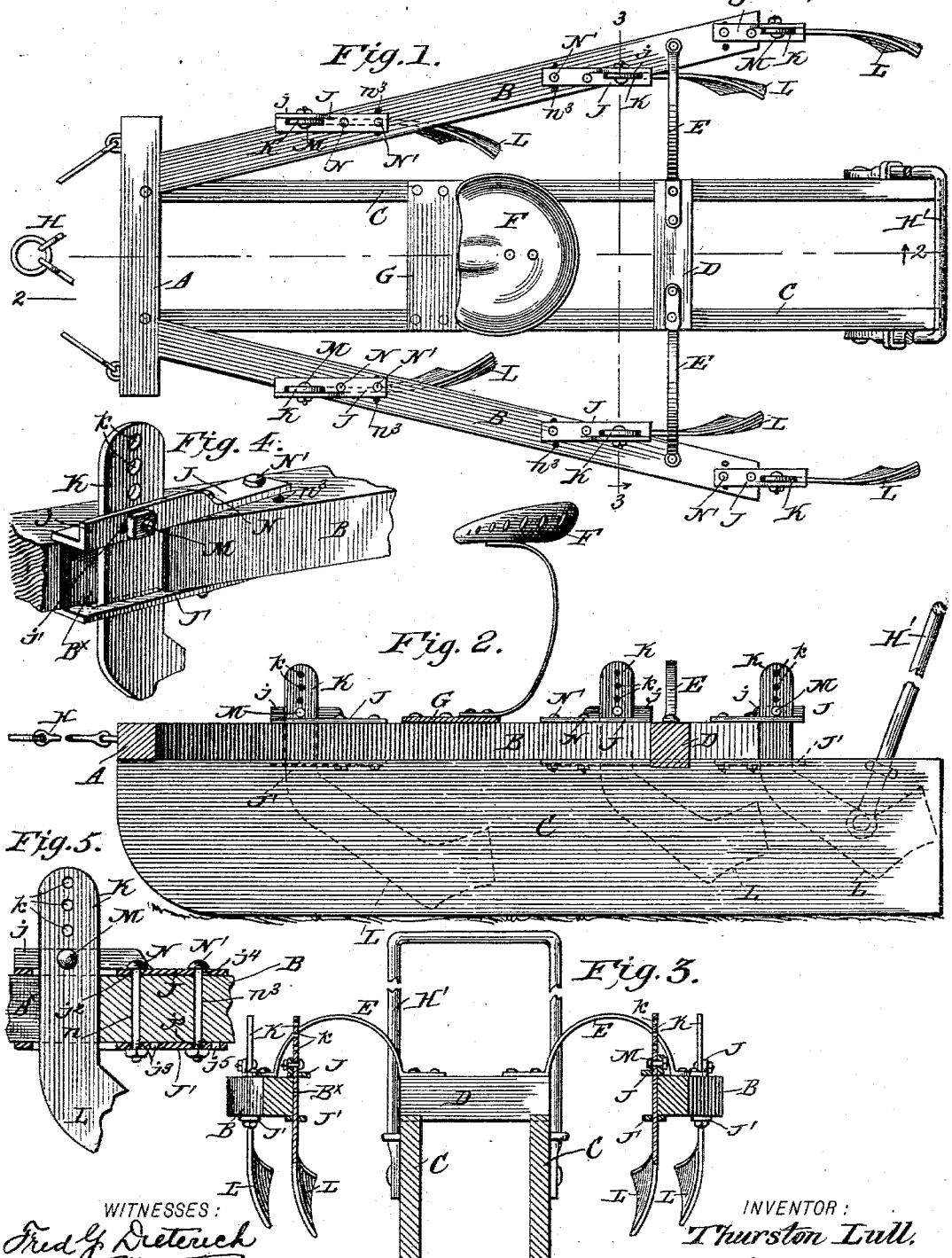

THURSTON LULL, OF AINSWORTH, NEBRASKA.

CULTIVATOR.

SPECIFICATION forming part of Letters Patent No. 490,151, dated January 17, 1893.

Application filed August 19, 1892. Serial No. 443,543. (No model.)

*To all whom it may concern:*

Be it known that I, THURSTON LULL, residing at Ainsworth, in the county of Brown and State of Nebraska, have invented certain new and useful Improvements in Cultivators, of which the following is a specification.

My invention relates to cultivators adapted to cultivate listed corn and other crops and it has for its object to provide knives or shovels so constructed and adjustable, as to thoroughly and completely cultivate all the ground between the rows and at the same time throw the dirt up to the row as much as necessary or desirable, and that, to any extent, without covering up or destroying the growing corn.

It has also for its object to afford facilities for adjusting the knives or shovels independently of each other so that they each shall plow a furrow, of any desired depth or plow a wide or narrow furrow as desired, and by means of double clevises, (in themselves adjustable) which support the shovels or knives, to set the knives or shovels at any angle desired.

With other minor objects in view which will hereinafter be apparent, my invention consists in the peculiar combination and novel arrangement of parts, hereinafter described and claimed, reference being had to the accompanying drawings in which Figure 1 is a top plan view of my improved cultivator. Fig. 2 is a vertical longitudinal section of the same on the line 2—2 Fig. 1. Fig. 3 is a transverse section of the same on the line 3—3 Fig. 1. Fig. 4 is a detail perspective view of one of the shovels or knives and the means for adjustably securing it to the beam, and Fig. 5 is a detail section of the same hereinafter specifically referred to.

The frame proper of my improved cultivator is formed of the front cross beam A, and the diverging rearwardly extending side beams B B. Extending longitudinally rearward from the front beam A, is a trough formed of the parallel timbers C C, which straddles the rows of corn as the cultivator is drawn along, and prevents the dirt from covering up the corn; it also shields the corn from the dirt thrown by the shovels.

D indicates a cross beam which connects the parallel timbers C C, and in turn is connected to the side beams B by the loop or bail brace rods E.

F indicates the driver's seat and G the foot board mounted on the trough timbers C C. H is the draft clevis and H' indicates the handle.

Upon the upper and lower sides of the side beams B is adjustably secured a series of clevises or shovel holding bars J J' the construction of which is most clearly illustrated in Fig. 3 of the drawings, by reference to which it will be seen, the shovel has a shank portion K, and a rearwardly extending portion L curved to a shape resembling the share and mold board of a plow, and such shank, which has a series of apertures $k$, passes up through elongated slots in the bars J J'. It will also be noticed that the upper bar J has a vertical flange $j$ on its inner edge which has a series of horizontally arranged apertures $j'$ through which passes the securing bolt M, which also passes through one of the apertures $k$ in the shank K, the usual lock nuts being employed to secure the parts in position. To hold the shovel shank with greater security against the beam, the outer face of the beam adjacent the front shovel shanks and the inner faces of said beam adjacent the middle shovel shanks, have a beveled cut out portion $B^x$ in which such shanks seat, as shown clearly in Figs. 4 and 5.

The upper and lower bars J J' are secured to the beams by the bolts N N', the forward one N of which passes through a single aperture $n$ in the beam and an aperture $j^2$ in the bars J and one of a series of longitudinally arranged apertures $j^3$ in the bar J', while the bolt N' passes through a single aperture $j^4$ in the bar J, through one of a series of apertures $n^3$ the beam A arranged in an arc about the bolt N, such bolt also passing through one of a series of longitudinal apertures $j^5$ in the bottom bar J' as shown.

As all of the shovels are secured to the beam A in a similar manner it will be seen that such shovels are each capable of vertical adjustment in its shank bearings, at different angles vertically by shifting the under bar forward or backward, or changing the lock bolt M, in the aperture $j'$, or at different angles to the beam, by changing the bolt N' in the several apertures $n^3$.

By referring to Fig. 2 it will be seen that the upper part or heel of the front shares is more receding and extends farther downward than the two rear ones, as such shares are closer to the row, and need cut the furrow deeper than the rear ones.

From the foregoing description taken in connection with the drawings it is thought the complete operation and advantages of my improved cultivator will be readily apparent and need not be further set forth.

Having thus described my invention, what I claim as new and desire to secure by Letters Patent is:

1. An improved cultivator comprising the front cross beam, the rearwardly diverging side beams, the shovel holding bars, held on such beams for lateral and longitudinal adjustment, the shovels pivotally supported in such bars for diagonal and vertical adjustments, the central trough like portion connected at the front end to the cross beam, and the bails connecting the beams and the rear ends of the trough portion, all arranged substantially as shown and described.

2. In a cultivator substantially as described, the combination with the beam B the bars J J' pivotally connected thereto, said bars having elongated slots, the upper bar J having a vertical flange $j$ formed with a horizontal series of apertures $j'$, of the shovels having apertured shank members, projected up through the slots in said bars and the securing bolt M, adapted to be fitted in either of the apertures in the flange $j'$ and the apertured shanks whereby such shanks can be held to incline at different diagonal inclinations substantially as described.

3. The combination with the beam B, the bars J J' projected diagonally to one side thereof said bars having elongated slots, the bar J' longitudinally adjustable on said beam, and the bar J having a vertical apertured flange $j$, of the shovel K having its shank projected up through the slots in the bars J J', and pivotally connected to the flange of the bar J all substantially as and for the purposes described.

4. In a cultivator substantially as described, the combination with the shovel beam having a cut out portion $B^\times$ and the bars J J' laterally adjustable over such cut out portion, said bars having elongated slots, and the bar J a vertical apertured flange, of the shovel having its shank loosely fitted in the slot of the bars J J' and pivotally connected to the apertured flange of the upper bar J all substantially as described.

THURSTON LULL.

Witnesses:
F. F. STEPHENS,
P. D. MCANDREW.